(12) United States Patent
Van Leeuwen

(10) Patent No.: US 10,885,605 B2
(45) Date of Patent: Jan. 5, 2021

(54) REGISTRATION OF HISTOPATHOLOGY IMAGES

(71) Applicant: KONINKLIJKE PHILIPS N.V., Eindhoven (NL)

(72) Inventor: Marinus Bastiaan (Rien) Van Leeuwen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 135 days.

(21) Appl. No.: 15/744,896

(22) PCT Filed: Jul. 16, 2016

(86) PCT No.: PCT/EP2016/067000
§ 371 (c)(1),
(2) Date: Jan. 15, 2018

(87) PCT Pub. No.: WO2017/013045
PCT Pub. Date: Jan. 26, 2017

(65) Prior Publication Data
US 2018/0211360 A1 Jul. 26, 2018

(30) Foreign Application Priority Data
Jul. 17, 2015 (EP) .................................... 15177346

(51) Int. Cl.
*G06T 3/00* (2006.01)
*G06T 7/33* (2017.01)
(52) U.S. Cl.
CPC .............. *G06T 3/0068* (2013.01); *G06T 7/33* (2017.01); *G06T 2207/30024* (2013.01)

(58) Field of Classification Search
None
See application file for complete search history.

(56) References Cited

U.S. PATENT DOCUMENTS 6,269,565 B1 * 8/2001 Inbar .................... G02B 27/024
345/87
6,408,107 B1 6/2002 Miller
(Continued)

FOREIGN PATENT DOCUMENTS

| EP | 2634749 A2 | 9/2013 |
|---|---|---|
| WO | 200101346 A1 | 1/2001 |

(Continued)

OTHER PUBLICATIONS

Lowe, D. "Distinctive Image Features from Scale-Invariant Keypoints", International Journal of Computer Vision, vol. 60, No. 2, pp. 91-110, 2004.
(Continued)

*Primary Examiner* — Jiangeng Sun
(74) *Attorney, Agent, or Firm* — Sherry Austin

(57) ABSTRACT

An image processing component (IPC) and related method for image registration of at least two sets of image objects. The image objects may be previously derived from a segmentation of imagery of biological material. Based on features of the image objects, an initial global transformation is computed. Using this initial global transformation and its inverse, one or more cross-links between sets of image objects across image objects in the two sets are established. A plurality of locally adapted transformations are then computed for cross-linked objects from the two sets. A combiner ($\Sigma$) then combines the locally adapted transformations t\ into a new registration transform $T^{NEW}$.

16 Claims, 5 Drawing Sheets

(56) References Cited

U.S. PATENT DOCUMENTS

| | | |
|---|---|---|
| 8,229,194 B2 | 7/2012 | Grunkin |
| 8,244,008 B2 | 8/2012 | Rohrer |
| 2003/0038811 A1* | 2/2003 | Gritz .................. G06T 15/06 345/581 |
| 2006/0110017 A1* | 5/2006 | Tsai .................. G06T 7/0012 382/128 |
| 2009/0232373 A1 | 9/2009 | Licato |
| 2010/0014722 A1* | 1/2010 | Rohrer .................. G06K 9/6207 382/128 |
| 2010/0046858 A1 | 2/2010 | Yun |
| 2010/0061601 A1 | 3/2010 | Abramoff |
| 2011/0311115 A1 | 12/2011 | Li |
| 2012/0162228 A1 | 6/2012 | Kajimoto |
| 2013/0142413 A1 | 6/2013 | Bahlman |
| 2013/0156279 A1 | 6/2013 | Athelogou |
| 2013/0182925 A1 | 7/2013 | Razeto |
| 2013/0230220 A1 | 9/2013 | Yu et al. |
| 2013/0243302 A1 | 9/2013 | Kajimoto |
| 2013/0305138 A1 | 11/2013 | Gocovate |

FOREIGN PATENT DOCUMENTS

| | | |
|---|---|---|
| WO | 2012051607 A1 | 4/2012 |
| WO | 2013148458 A1 | 10/2013 |
| WO | 2014206722 A1 | 12/2014 |

OTHER PUBLICATIONS

Lindenberg, T. "Feature Detection with Automatic Scale Selection", International Journal of Computer Vision, vol. 30, No. 2, 1998.

Mikolajczyk, K. et al "A Performance Evaluation of Local Descriptors", IEEE Transactions on Pattern Analysis and Machine Intelligence, vol. 27, No. 10, pp. 1615-1630, 2005.

* cited by examiner

REGISTRATION OF HISTOPATHOLOGY IMAGES

CROSS-REFERENCE TO PRIOR APPLICATIONS

This application is the U.S. National Phase application under 35 U.S.C. § 371 of International Application No. PCT/EP2016/067000, filed on Jul. 16, 2016, which claims the benefit of European Patent Application No. 15177346.2, filed on Jul. 17, 2015. These applications are hereby incorporated by reference herein.

FIELD OF THE INVENTION

The invention relates to an image processing component, to an image processing system, to an image processing method, to a computer program element, and a computer readable medium.

BACKGROUND OF THE INVENTION

Image registration is about alignment of an image pair containing one or more corresponding objects that exhibit similar appearance. For instance, in digital pathology, such an image pair, usually of relatively high resolution, may be constituted by two scans of microscopic tissue slices. Registration of tissue scans can simplify the interpretation of information captured in scans of multiple tissue slices from the same tissue block. Example applications for digital pathology are: registration of two or more scans for the purpose of simultaneous navigation, or registration of a set of scans for the purpose of 3D reconstruction or registration of a set of scans belonging to re-stains (that is, staining using different dyes) of the same tissue slice.

Previous registration approaches for high resolution imagery are either not responsive enough or accuracy appears too compromised by relatively heavy down-sampling.

SUMMARY OF THE INVENTION

There may therefore be a need for an alternative system or method for image registration.

The object of the present invention is solved by the subject matter of the independent claims where further embodiments are incorporated in the dependent claims. It should be noted that the following described aspect of the invention equally applies to the image processing method, the image processing system, to the computer program element and to the computer readable medium.

According to a first aspect of the invention there is provided an image processing component, comprising:

an input interface to receive at least two sets of image objects, wherein at least one set includes a single image object or a plurality of image objects, said sets of image objects derived from imagery of biological material;

an image feature deriver configured to derive image features of or in relation to the image objects;

a global transformation builder configured to compute, based on said features, an initial global registration transformation for the at least two sets of image objects;

a cross-linker configured to establish, based on said initial global registration transformation and its inverse, at least one cross-link between image objects from the at least two sets of image objects.

According to one embodiment, the image processing component further comprises:

a local transformation builder, configured to compute for said cross-link, at least one locally adapted transformation that is restricted to those image objects that are cross-linked in said cross-link;

a combiner configured to perform a combination operation to combine i) at least said locally adapted transformation and at least a part of said initial global registration transformation or ii) a plurality of locally adapted transformations into a combined registration transformation for the at least two sets of objects; and an output interface to output said new global transformation.

According to one embodiment, the image processing component of claim 1, wherein operation of the global transformation builder for computing the at least one locally adapted transformation is based on one or more of the features previously derived by the image feature deriver.

According to one embodiment, the image processing component comprises a refiner configured to:

sub-divide respective image objects from said at least two sets, into sub-objects to obtain sets of sub-objects;

compute, for said sub-objects at least one sub-locally adapted transformation;

wherein the combiner is operative to include into said combination operation, said at least one sub-locally adapted transformation.

According to one embodiment, the image processing component comprises a graphics display generator operative to effect displaying a registration result as per said initial global transformation and/or to update the displaying for a new registration result as per an intermediate registration or as per the combined registration transformation.

According to one embodiment, the image processing component further includes a sampler configured to up- or down-sample at least one of the at least two sets of image objects in case no initial global transformation can be computed by the transformation builder engine.

According to one embodiment, the image processing component of any one of previous claims, wherein operation of the combiner is based on b-splining.

According to one embodiment, the image processing component of any one of previous claims, wherein at least one of said image objects has been derived by an image segmentation operation applied to said imagery.

According to another aspect, there is provided an image processing method, comprising:

receiving at least two sets of image objects, wherein at least one set includes a single image object or a plurality of image objects, said sets of image objects derived from imagery of biological material;

deriving image features of or in relation to the image object in the at least two sets;

based on said features, computing an initial global registration transformation for the at least two sets of image objects;

establishing, based on said initial global registration transformation and its inverse, at least one cross-link between image objects from the at least two sets of image objects.

According to one embodiment, the image processing method comprises the steps of:

for said at least one cross-link, computing at least one locally adapted transformation that is restricted to those image objects that are cross-linked in said cross-link;

combining i) at least said locally adapted transformation and at least a part of said initial global registration transformation or ii) a plurality of locally adapted transformations into a combined registration transformation for the at least two sets of image objects; and outputting said combined transformation.

According to one embodiment, the step of computing the at least one locally adapted transformation is based on one or more of the features previously derived at the deriving step.

According to one embodiment, the imagery of biological material includes at least one digital pathology image.

The proposed method allows avoiding additional computational costs such as in previous hierarchical refinement solutions where each step to higher resolutions results in additional computational costs for features at the new resolution levels. The proposed method allows computing features once and then reusing selections from the same feature pool at the same resolution level throughout the execution of the algorithm. More particularly, the locally adapted transformations are computed at the same image resolution (level) than the initial global transformation. In general, no change in resolution level is necessarily required. Both, the feature re-use and operating at the same (image) resolution level, result in a more efficient image object registration algorithm.

The proposed method and image processing component are highly responsive as they allow registration results to be produced within seconds rather than minutes, even for very large images, such as in the Gigapixel range, frequently used in digital pathology. This enables applications that require low throughput time and applications where processing power is shared with other tasks than only image registration.

Unlike previous approaches that relied solely on a single global registration transformation, the proposed method merges the new registration transformation from, in general, a plurality of locally adapted transformations based on the cross-linking operation. This allows preventing model errors caused by the initial global transformation. This is because, via the cross-linking and the one or more locally adapted registration transformations, the proposed method and image processing component allow accounting for non-global variations of object features such as shape or form. For instance, in the field of histology, differences in appearance of corresponding tissue regions in one or more digital pathology slide images may be caused by staining of tissue samples. A certain tissue that is easily detectable in one of the images may be almost invisible in the other image. This marked variation in appearance can introduce confusion in the step of computing the initial global registration transformation. That is, the proposed algorithm is "aware" that discontinuities in the initial global transformation may occur, such as in the histology context, where an imaged sample consists of more than one tissue region.

The proposed component and method allow addressing this via the cross-linking operation. Both, the initial global transformation and the inverse transformation of the initial global transformation are used (hence, "cross"-linking) in an explicit intermediate step to identify and rectify potential inconsistencies in correspondences between the image objects. Otherwise, these inconsistent correspondences may remain if one were to rely on the initial global transformation alone. The initial global transformation may lead to these inconsistent correspondences for instance in the context of image segmentation where the objects are generated by over- or under segmentation.

In general there will be a plurality of such cross-links, each defining a respective cluster of the image objects so cross-linked. The computation of the locally adapted transformation is restricted to only those objects that are linked together in the given cross-link. The computation of the locally adapted transformations is feature based, just like the computation of the initial global transformation. But for the computation of the locally adapted transformation, only those features are used that belong to the objects in the given cross-link. A corresponding computation of a respective locally adapted transformation is performed for each cross-link which yields in general a plurality of different locally adapted transformations, one for each cross-link. The initial transformation may then be replaced (possibly completely) by the combination of this plurality of locally adapted transformations.

To summarize the advantages secured herein, by combining, in one embodiment, the locally adapted transformations with the initial global transformation, more accurate registrations can be achieved. Robustness is achieved in particular by the proposed cross linking step whereas computational efficiency, and hence responsiveness is improved by re-using of features (in particular during the refinement step) at the same resolution.

An "image object" is a region or set of image points (pixel, voxel, etc) of an image. The region may not necessarily be topologically connected in one whole but may comprise a plurality of unconnected or scattered sub-regions. The image objects may be derived from a segmentation operation, but this may not be necessarily so as the image objects may be derived instead through manual specification, or from feature clustering techniques, etc.

The term "at least two sets of image objects", may relate to respective image objects in or from two different images, or may relate to respective image objects in different image parts of the same image.

The term "cross-link" as used herein relates to a cluster of objects that can be linked or associated by either the initial global transformation or by its inverse, wherein the initial global transformation and its inverse are considered as transformations on objects rather than image points.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
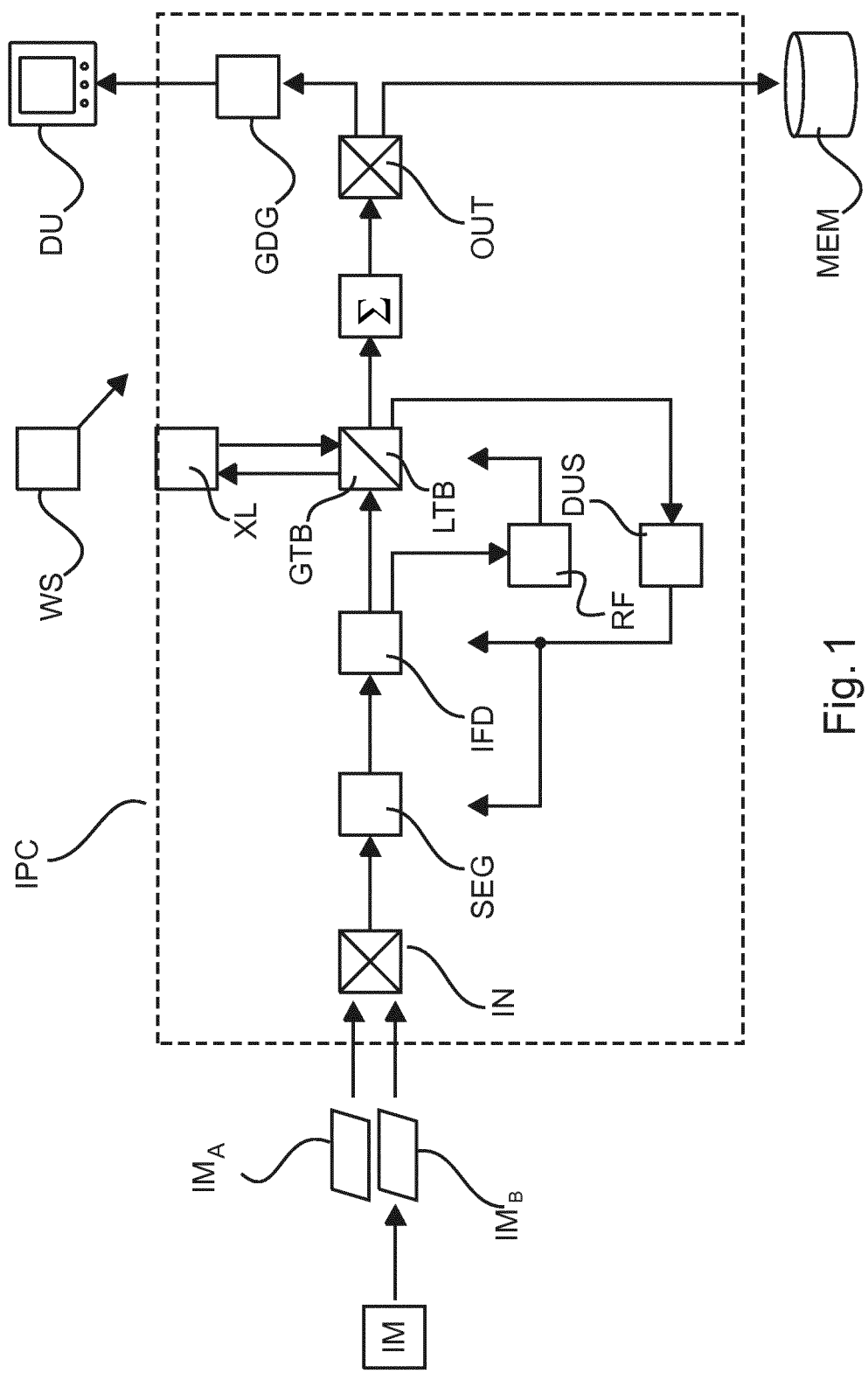
FIG. 1 shows a block diagram of an imaging system.

With reference to FIG. 1, there is shown a block diagram of an image processing system as envisaged herein, particularly (but not necessarily only) for the purpose of digital pathology imaging.

The imaging system includes an imaging modality IM that supplies digital images of histological slices for instance.

The imaging system further includes an image processing component IPC for processing the supplied images. For ease of reference these images or frames will be referred to herein as image $IM_A$ and image $IM_B$ with the understanding that the following is not meant to be restricted to two images only. The image processing component IPC allows spatially registering the (at least) two images $IM_A, IM_B$ with respect to each other. The proposed image registration has been found to be particularly robust against morphological or other property changes of corresponding structures as recorded in the two images.

We now first turn to briefly outline some particulars of digital pathology imaging to better motivate the proposed system, with the understanding that the proposed system is not to be restricted to digital pathology only. In an initial procedure, a sample specimen of tissue is treated with formalin and is then embedded in paraffin. This procedure (also referred to as FFPE) allows preserving the molecular structure and to solidify tissue specimen. Using a histological cutter such as a microtome or similar, two or more sections of the so treated tissue are then taken. The tissue slices are then processed ("stained") with suitable dyes ("stains") to enhance contrast of structures of interest such as nuclei and their surrounding cytoplasm. One common staining procedure is to use Hematoxylin & Eosin (H&E) for one of the sections and Immunohistochemistry (IHC) stain for the other. Other staining procedures (re-staining) are also envisaged herein. Examples are Hematoxylin stain only, tissue stained with fluorescent marker(s), and unstained tissue. The tissues may be taken from the same block or from different (eg, neighboring) blocks. The dyed or stained tissues are then typically (but not necessarily) mounted between a standard glass slide and a cover slip (a piece of glass, thinner than the supporting glass slide) to form one or two microscopic slide(s). Both tissues may be mounted (side by side say) on the same slide or on different slides.

Using a suitable imaging modality such as a digital microscope MC, a digital slide scanner PSC, or even an imaging device that captures the image data at (e.g.) 0.3× magnification (scanning or non-scanning), two digital images $IM_A, IM_B$ are then obtained as a single file or as two separate files, depending on whether the two slices were mounted on the same slide.

A common task in digital pathology is to "re-find" corresponding structures in the two image $IM_A, IM_B$. This is essentially an exercise in image registration. However as will be appreciated from the above procedure, this may not be straightforward because one and the same structure may be markedly different in visual appearance in the two images $IM_A, IM_B$. First of all the two slices, although taken from the same tissue specimen, will still include different parts of the tissue. Second, the slicing or cutting operation to sever the two sections from the tissue block, may cause different amounts of stretching, compressing or even "folding over" parts of the tissue sections when placing the sections on their respective glass slides. Third, the two sections may have been dyed differently. Those differences in stain/stain uptake in the tissue samples are one of the main causes for differences in appearance of the tissue. Tissue that can easily be detected in one of the images may be almost invisible in the other image. In short, the variation in shape and appearance of corresponding tissue pieces in the image pair poses other challenges for registration. Shape can differ because of several reasons. The tissue can be stretched or compressed, and can be deformed due to folds or tears. Furthermore, in case of multiple tissue pieces, pieces may have moved a little relatively to each other resulting in local variations in position and orientation.

With continued reference to FIG. 1, an architecture of the proposed image processing component IPC is shown within the dashed rectangle.

The registration component IPC includes an input port IN for receiving the image objects, for instance as per two images IMA, IMB. Broadly, the architecture of the image processing component IPC is made up of a pre-processing stage for definition of the image objects, which in a preferred embodiment (but not necessarily all embodiments) comprises a segmentation unit SEG and feature identification IFD unit. Imagery processed at this stage is then forwarded to the actual image-registration stage which includes a global transformation builder GTB and a local transformation builder LTB. There is also a combiner E and, optionally, a refiner circuitry RF and/or a sampler DUS. In a preferred embodiment, the sampler DUS is for down-sampling, but embodiments with up-sampling are not excluded herein. The registration result (in particular, an algorithmic description of an image transformation TNEW) is output at output port OUT.

In distinction to existing registration schemes, the proposed image registration component IPC includes in particular a cross linking component XL. Before going into more detail (below at FIG. 2) as to the functioning of the proposed IPC, the operation of the image registration component IPC is briefly outlined for a better overview. In one embodiment it is envisaged that the image processing IPC is run as a software routine on a workstation WS such as a general computed platform associated with the imaging modality IM. The image processing IPC component may of course also run on a standalone computing platform.

Operation

Two sets of image objects to be registered are received at input port IN. The sets of image objects may be in two images A,B. This is assumed to be the case in the following although this is an illustrative embodiment only as the two sets of objects may be defined in a single image.

The image objects may be previously derived by a segmenter SEG that has segmented the two images although other techniques for defining image objects are not excluded. Definition by segmentation is used in the following as an illustrative embodiment only.

The objects in the two images are then examined by the feature identification component IFD. The features include for instance area size, shape or spectral features as the histological images are frequently recorded as color images to better show tissue differentiation by means of colors for instance. The features may describe the objects themselves or their may relate to features in their neighborhood.

Once the features (that is, one or more features for some or all of the objects in the two images) have been defined and computed, process flow then passes on to the global transformation builder GTB. The global transformation builder GTB computes, based on the feature pool produced by feature identification component IFD, for the whole of the two images a single, global transformation. This transformation, referred to in the following as the initial transformation, can be applied to any image object in one of the images, say image $IM_A$, and is then mapped to what is believed "prima facie" to be a corresponding image object in the second image $IM_B$. In general, the algorithm underlying operation of the global transformation builder GTB is based on feature correspondence. In other words the features previously computed are compared across the two images by means of a suitable metric which measures or quantifies the "amount" of correspondence for a given pair. The pair of objects whose features attract the highest or high enough correspondence (the latter can be established by defining suitably adjusted correspondence thresholds) are then considered to be in correspondence to each other across the two images. In this manner, each chunk or object in image $IM_A$ is matched or mapped to a corresponding one of the image objects in image $IM_B$. At this stage the initial transformation is a global, hence relatively coarse, description of how one needs to "warp" image $IM_A$ to arrive at image $IM_B$ as the initial transformation fulfills the correspondence requirements only "globally" as it operates on the whole of the image and does not at this stage necessarily take specific account for local warping requirements in the two images. The respective amount for correspondence as per each pair of objects is fed into a global objective function which is then evaluated to compute, on a global level, the global initial transformation. As will be seen below this initial global transformation T and/or its inverse $T^{-1}$ (preferably both) is/are then used by the local transformation builder LTB to compute a plurality of locally adapted transformations which are then combined by the combiner $\Sigma$ into the improved, that is, more precise, combined transformation $T^{NEW}$ whose description is then provided at output port OUT. The local and global transformations builder can be combined into a single functional entity.

The robustness mentioned earlier of the proposed image registration is at least partly obtained thanks to the operation of the cross linker XL. The cross linker XL uses the initial transformation and its inverse (its mathematical inverse that is) to establish the cross links between objects or groups of objects across the two images. More particularly, the cross linker XL links-up one or more objects at a given image location in the first image IMA with one or more image objects in the second image IMB. The initial registration transformation may be assumed to be one-to-one as a function between image points (such as pixels or voxels) so its inverse always exits as an image point function. However, for the purposes of establishing the cross-link, the image point definition of the initial global transformation can be used to define the initial global transformation and its inverse as respective transformations between objects. A given cross-link will in general comprise sets of objects from the first image and the second image. In other words, by going forward (via T) and backward (T−1) the cross linker XL lumps together all those objects across the two images that can be reached by either T's or T−1's mapping action, when T is defined on objects rather than image points. For instance, after cross linking one may end up with an associative structure such as $\{A1,A2\}<->\{B1,B2,B3\}$ where a sub-set of objects Ai or Bi from the two images (IMA or IMB) are associated with each other. The sets may also be singletons (that is, are formed from a single object) such as $\{A1\}<->\{B2\}$ or a singleton from one image may be associated with more than one object from the other image. Operation of the cross linker will be illustrated later, in more detail below at FIGS. 2, 3 and 4.

After cross-linking, the local transformation builder LTB takes over. Functionally, the local transformation builder LTB is similar to the global transformation builder GTB but, in contrast to the GTB, the LTB does not operate at once across the whole of the image objects globally, but operates for any given cross-link separately and restricted to objects linked up by linker XL in said given cross-link. In fact, in one embodiment, the local transformation builder LTB and the global transformation builder GTB are integrated into a single functional entity. The operation of local transformation builder LTB allows to specifically account for local warping characteristics. These local characteristics are not specifically taken into accounting when computing the initial global transformation. When computing initial global transformation, the local transformation requirements are averaged out or are balanced against the global requirement to satisfy the global objective function. In contrast, the local transformation builder LTB operates instead, on some or each cross-link in isolation to produce a plurality corresponding locally adapted transformations that is, at least one local transformation $t_i$ for each cross-link. The collection of the so adapted local transformations $t_i$ are then combined, for instance in a B-spline operation or other function fusion scheme, to form a new transformation $T^{NEW}$ that is then output at output port OUT. The registration results as per the new transformation $T^{NEW}$ can then be studied by applying the same to one of the images, say image $IM_A$, and the registration can then be graphically rendered for display on a display unit DU such as monitor by way of a graphics display generator GDG. The registration result as per the initial transformation and or intermediate results can also be displayed. More specifically, in one embodiment intermediate registration results are updated and this is displayed as the new transformation is being built up from its components, that is, from the locally adapted transformation. At some or each step(s) during the build-up, an intermediate transformation is illustrated by the graphic display generator GDG on the display unit DU.

One way envisaged herein to present the registration result to the user is to effect displaying on a display unit of both images next to each other in a simultaneous navigation mode. In this mode, a size of the respective field of view and the magnification at which the images are displayed are kept the same. A center of the field of view of one of the images $IM_A,M_B$, is linked to the center of the field of view of the other image via the registration information. If the user browses in one of the images $IM_A,M_B$, the center of the field of view in the other image will automatically move along to ensure that the respective centers of the fields of view correspond to each other.

In another embodiment, the registration result is presented by displaying one of the images $IM_A,M_B$ in one view port/window, and the other image, after registration, in a second view port/image window. The user can then toggle between both images to study the staining patterns after registration.

On occasion it may happen that the operation of the local transformation builder LTB fails to compute a locally adapted transformation for a cross-link because the required degree of correspondence across objects in the said cross-link cannot be established. To account for this eventuality, the IPC includes in one embodiment a down-sampling component DUS which operates on the input images $IM_A$, $IM_B$ to down or up sample the images. The above described algorithm is then re-run based on the resampled images to then hopefully achieve better correspondence. However, once the initial input images $IM_A,IM_B$ are suitably down-sampled, the proposed image processing component IPC is capable to work on a single resolution level only so no further up or down-sampling is required.

Occasionally the objects produced by the segmenter SEG or the number of objects in a cross-link may be considered too large as measured against suitably defined limits in terms of number of members per object per cross-link and/or area size. It is therefore proposed in one embodiment, an optional refiner RF that splits up large objects into sub-objects. The refiner RF then operates on the features in the newly formed sub-objects to compute sub-locally adapted transformations between sub-objects.

Figure 2:
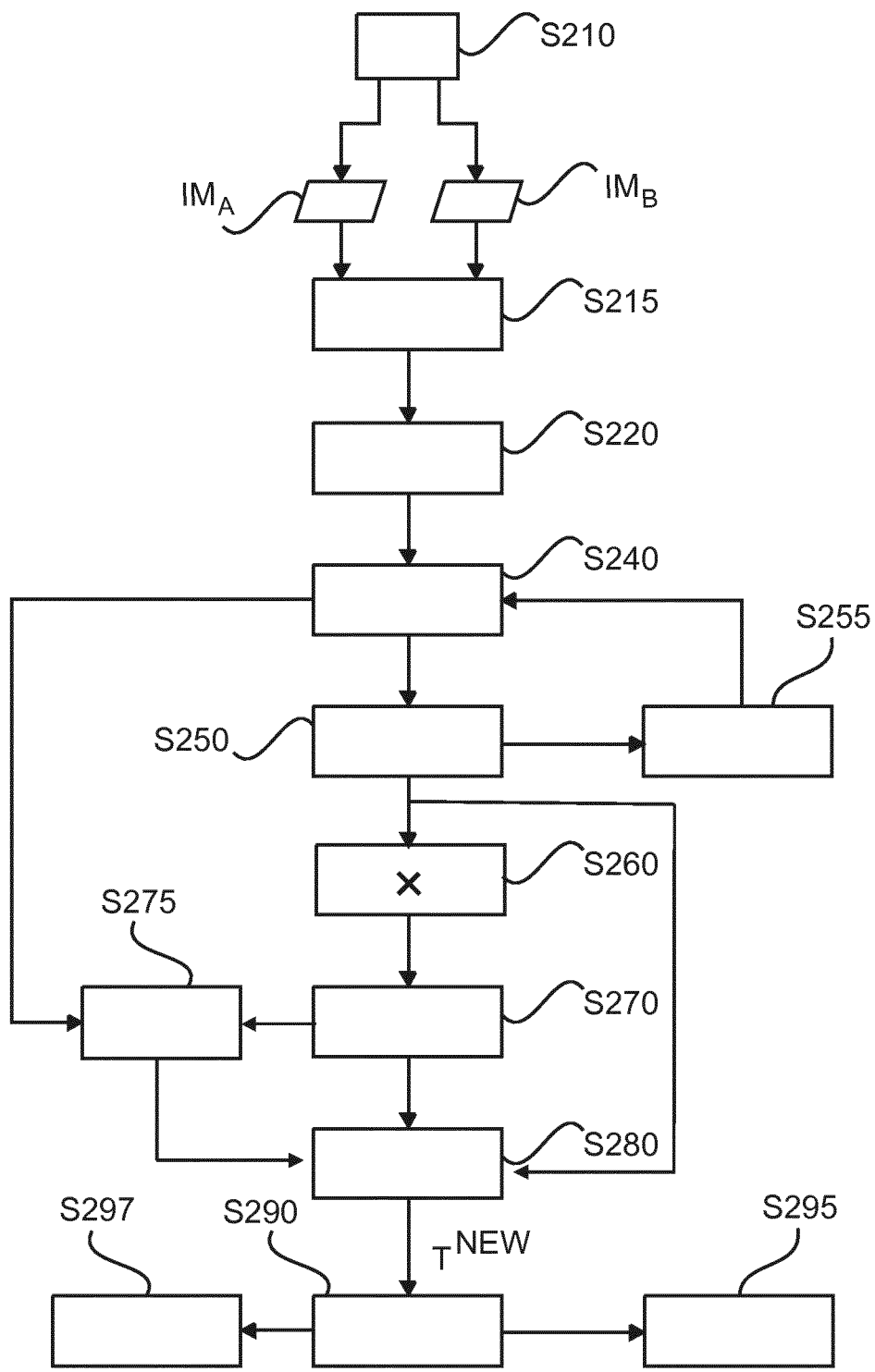
FIG. 2 shows a flow chart of an imaging processing method.

With reference to FIG. 2, operation of the imaging processing component IPC is now explained in more detail. It will be appreciated however, that the flow chart in FIG. 2 and the description that follows is not necessarily tied to the architecture as laid out in FIG. 1 and the algorithm as per flow chart in FIG. 2 can be read as standalone instructions. The method will be illustrated for the case where the sets of image objects are defined in two images $IM_A, IM_B$, where a respective one of the sets of image objects corresponds to image objects in the respective image $IM_A, IM_B$. However this is not limiting as the sets of image objects may also correspond to different parts of a single image.

At initial step S210, the two (or more) images $IM_A, IM_B$ are produced. This can be achieved by histological imaging or by imaging procedures other than in digital pathology. Remaining, for the sake of illustration, within the digital pathology context, two histopathology (digital) images $IM_A$, $IM_B$ of two slices of a tissue block are obtained. The digital images can be acquired from successive slices or non-successive slices from the same tissue block. A single slice may also be used and the two images are acquired after tissue re-staining. At least in digital pathology, the images $IM_A, IM_B$ can be relatively large, eg, in the Gigapixel range with sub-micron resolution.

At an additional, optional step the images may be downsampled. The purpose of down-sampling is to obtain images that are small enough to allow for acceptable computation time, but still contain enough details and resolution to achieve acceptably accurate results. It has been found however, that down-sampling is not usually required with the proposed method.

According to one embodiment, at step S215, the image objects are derived. This can be done via a segmentation of the images. This results in (at least) two sets of image objects, namely one or more sets of objects per image $IM_A, IM_B$. Any segmentation algorithm can be used for this step. Segmentation includes in particular background versus tissue segmentation. According to one embodiment, characteristics (background-mean and background-variance) of the background intensity are derived. Next, pixels are classified as "most likely belonging to the background" if their intensity is higher than a background threshold, which is defined in one embodiment as: backgroundThreshold=backgroundMean−2*backgroundVariance.

In one embodiment, image smoothing (as pre-processing step) or morphological operations can be applied to make the image segmentation result less noisy. Optionally, very small objects classified as "most likely tissue" are considered to be noise and are removed from further analysis. This may save computation time.

It will be understood that, although mainly envisaged herein, segmentation is only one embodiment among many other embodiments to derive said two (or more) sets of image objects. For instance, the objects can be derived directly as output of a scanner. In modern pathology scanners, a technology is used to identify the location of pieces of tissue. This information is used to limit scanning to only those parts of the sample that are relevant for a given task. This reduces scanning time and limits image size. Other information provided by the scanner for this purpose is information about focus. Alternatively, the objects may be output from a manual or semi-manual tissue selection procedure. Yet alternatively, the objects might be provided by a feature clustering technique, eg, k-means clustering on the location of keypoint feature locations and their respective absorption value. In the following, the method will be illustrated largely in the context of segmentation, however this is not to limit application and scope of the proposed method.

At step S220, the image objects from the two images $IM_A, IM_B$ are then received.

At step S240, image features are derived of or in relation to the image objects in the two images. One way to compute features for image registration is described in e.g. in D Lowe in "Distinctive Image Features from Scale-Invariant Keypoints", International Journal of Computer Vision, 60, 2, pp. 91-110, 2004. This approach is based on the scale-invariant feature transform SIFT. In the SIFT approach, so-called keypoints are derived from scale space and are described by a feature vector. The description of the features is invariant to variations in feature orientation and feature scale and, to some extent, even robust against variations in perspective. However, other non-SIFT-approaches are also envisaged herein, namely because scale invariance and robustness against differences in perspective is not needed in the application foreseen by the proposed method. Therefore, for present purposes and according to one embodiment, it is of note that features exist at multiple levels of detail. Extraction of features at multiple levels of details is based in one embodiment on the derivation of scale-space representations of the input images $IM_A, IM_B$ (using, for instance, image filtering with the Laplacian of Gaussian or Difference of Gaussian). Robust and "interesting" or salient image points can be automatically extracted from scale-space by extrema detection over space and scale. These extrema provide information about the location (x,y) of the interesting image points, as well as the extent of the local area around the respective image point that should be considered in the description (or characterization) of said point. Some general ideas on image feature based processing is described in more detail by T Lindenberg, "Feature Detection with Automatic Scale Selection", International Journal of Computer Vision, 30, 2 1998. Examples of various feature descriptors can be found in K Mikolajczyk and C Schmid, "A performance evaluation of local descriptors", IEEE Transactions on Pattern Analysis and Machine Intelligence, 27, 10, pp. 1615-1630, 2005.

In one embodiment, features that are not on or near objects classified as "most likely tissue" are removed from further analysis. "Nearness" is measured against predefined neighborhoods. In one embodiment, the derivation of the image features is done with a, in general, single set of pre-defined parameter settings that define the way the scale space is computed or how parameter settings are to be used to extract the features from scale space. In an alternative approach, image feature derivation starts with a selection of a sub-region in the image. Then, features in this sub-region are computed for a limited set of parameter settings. Next, those parameter settings are selected that provide the best fitting features for this sub-region. The selected parameter settings are then used for the registration of the images.

At step S250, an initial global registration transformation for the image objects in two images is computed as a point function. This computation takes account of essentially all the image features. In this manner, a single transformation for the whole of the image objects in the images is produced. The initial transformation may be computed based on feature correspondences as described, eg, in the above mentioned Lowe paper. In this and similar algorithms, a metric is used to quantify the degree of correspondence and is typically based on the matching quality of feature correspondences and the total number of feature correspondences that agree with the geometry underlying the feature locations in a template. A distance measure such as Euclidean distance or other, between feature vectors for the objects in the two images defines a "score", possibly after suitable normalization. If this score is less than a certain numerical threshold value, then the respective two features do not match. If said score equals or even exceeds said threshold, the features are considered to match. Another form of template for matching purposes as used herein is to define a suitable family of parameterized transformations for transforming the two images, and hence the objects, into one another. The parameters are then fitted to the two images at hand, and are then evaluated by a cost function to define the score. For instance, the lower the cost, the higher the score, etc. However, existing algorithms such as SIFT generally assume a relatively high level of correspondences between the images. For instance, geometric deformations are usually assumed to be limited to variations in orientation and scale only, and perhaps allow for only small variation in perspective deformation as in SIFT. The rationale underlying those constraints is that SIFT and similar algorithms are based on similar "visual appearance" and therefore work best if the variation in appearance is limited. This assumption however usually fails in the digital pathology imagery which is why in the approach proposed herein, the so computed global transformation is a mere intermediate result that is now used in the following to address the heterogeneity of structure appearances across the two images.

At step S260 a cross linking operation is carried out. To achieve this, one or more, in general all, image objects in one image are mapped into the second image by using the initial global transformation. In addition to using the global transformation, its inverse is also computed and applied to the second image so as to now map image objects (back) into the first image. Due to differences in segmentation of the images, the relation between the objects in both images may not be one-to-one, and therefore it is proposed herein to cross-link the objects using both, the global transformation as well as its inverse.

Cross-linking allows coping with the differences in appearance of corresponding objects in images $IM_A, IM_B$. These differences may have been caused by over- and under segmentation of objects classified as tissue. Also, in case of tissue classified objects that are close together, it will not always be easy to determine if they do belong to one and the some tissue or not. This confusion can result in inconsistency in the tissue objects when they are segmented in images A and B. In other words, cross-linking helps to find out which object in image $IM_A$ corresponds to which object in image $IM_B$.

Figure 3:
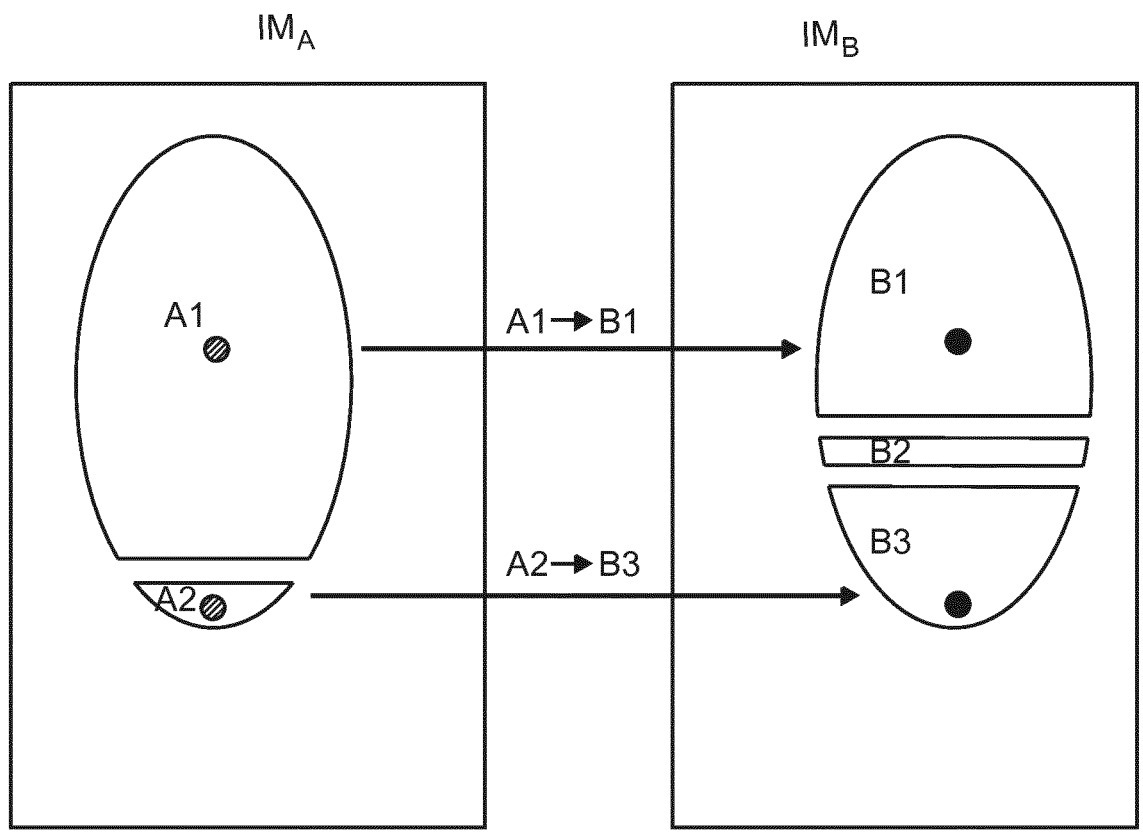
FIGS. 3 and 4 illustrate a cross-linking operation used in the method of FIG. 2.
Figure 4:
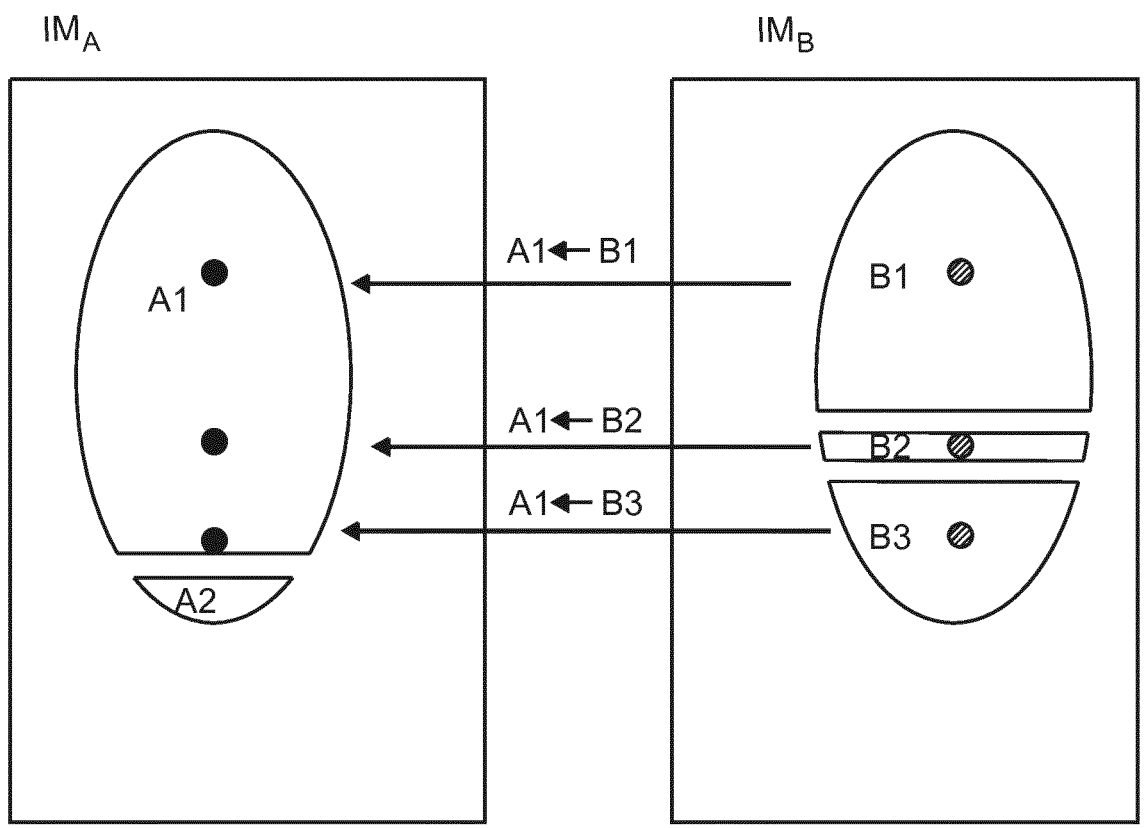

In one embodiment, the cross-linking is implemented by defining certain action points. For instance, one can establish a first set of links between objects by mapping (or "warping") certain designated or action points (e.g., center locations or other geometric loci) of object(s) in image $IM_A$ onto image $IM_B$ using the initial global transformation T. If a warped action point ends up on (that is, inside) a tissue object in image $IM_B$, the two objects are then considered linked under the action of T. Next, one proceeds "backwards" and does the same for objects in image $IM_B$, by warping onto image $IM_A$, using the inverse $T^{-1}$ of the global transformation. The two mapping operations via T and $T^{-1}$, one obtains a cluster of objects linked together by T or $T^{-1}$. Consider the following example of object clustering: suppose object A1 in image $IM_A$ is linked to object B1 in $IM_B$ and object A2 in image $IM_A$ is linked to object B3 in image $IM_B$ as per warping from image $IM_A$ to image $IM_B$ under T. Next, objects B1, B2 and B3 in image $IM_B$ are each linked to object A1 in image $IM_A$ as per warping from image $IM_B$ to image $IM_A$ under $T^{-1}$. Lumping all these links together, will result in a cross-link between the objects{A1,A2} in image $IM_A$ and objects {B1,B2,B3} in image $IM_B$. Cross-linking (i.e. warping from image $IM_A$ to image $IM_B$ and in reverse from $IM_B$ to image $IM_A$) allows achieving robustness in case of over/under-segmentation in step S215. This cross-linking example is illustrated in FIG. 3 (forward) and FIG. 4 (backwards). The action points, and the points these action points are mapped onto, are illustrated as hatched and dark dots, respectively. More generally then, for present purposes the cross-link operation can be defined based on considering T and $T^{-1}$ as transformations between objects as follows: for any object o, $T^{-1}(o)$ is that object o' into which a designated point (the action point) of o is mapped into under $T^{-1}$. Said differently, if object o's action point happens to be mapped into a point of object o', then the objects o, o' are linked via $T^{-1}$. As can be seen, the definition of T and $T^{-1}$ as object transformations is based on the image point definition of T,$T^{-1}$ as it is the location of the action points that determine whether a link is established. The same considerations apply when considering T as function between objects to establish links in the other direction. Namely, T(o) is that object into which a point (ie, action point) in o is mapped into under T. The collection or cluster of objects that are linked, either via T or $T^{-1}$, are then said to form the cross-link. In general there will be a plurality of different cross-links. It is of note that the definition of T and $T^{-1}$ as object transformations introduces an asymmetry: one may find that if application of T creates a link between o and o', then there may also be a link from o' to o when cross-linking by applying $T^{-1}$. However this is not so necessarily, because the links are established by using the action points (eg center points) of objects. It is therefore possible that, although there is a link found between o and o', no link is found when the cross-linking from o' to o when applying $T^{-1}$. This asymmetry is illustrated in FIGS. 3,4: the link from B2→A1 is found only when cross-linking via $T^{-1}$ as shown in FIG. 4. As shown in FIG. 3, this link would not have been found had one relied on linking in one direction only, that is, via T only.

At step S270, for any one cross-link, a respective locally adapted transformation is then computed. In other words, the same algorithm as above in step S250 may be used, however, this time the respective locally adapted transformations are not computed globally but each only at "cluster level", that is, the features considered in the locally adapted transformation computation are restricted to features of only those objects that are linked together in the given cross-link. More particularly, for any one cross-link, the feature pool previously created at step S240 is revisited to collect the subset of features that belong to the objects in the cross-link under consideration. Said differently, in step S270, for each cross-link or cluster, a dedicated, locally adapted transformation $T_{cl}$, at cluster level, is obtained by using only those of the previously computed features that belong to the objects in the cross-link at hand. In this manner, a plurality of local transformations $T_{cl}$ are produced, one such transformation $T_{cl}$ for any given cross-link cl. Each of the transformations is adapted to objects (and their features) in the respective cross-link only.

Figure 5:
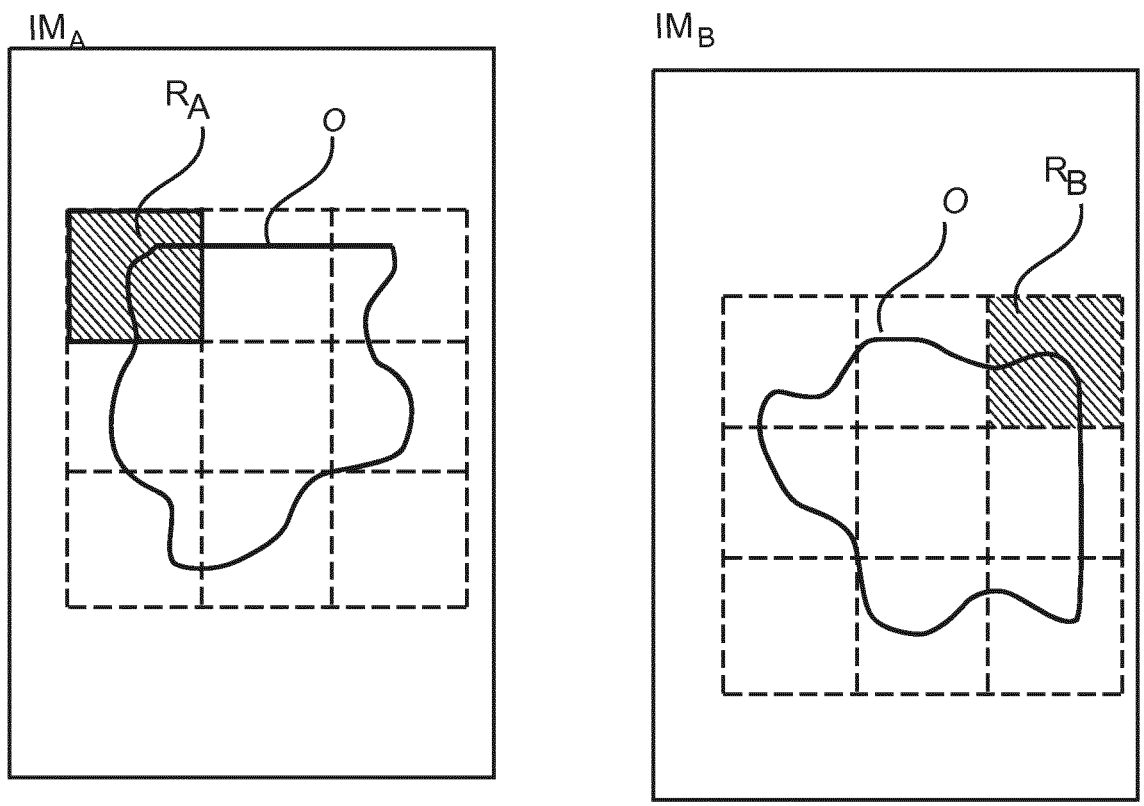
FIG. 5 illustrates a further processing step in the image processing method as per FIG. 2.

As shown in the examples in FIGS. 3,4, over-segmentation can be identified by lumping together objects as per the proposed cross-linking. In the examples, image $IM_A$ was over-segmented into two pieces A1 and A2, and corresponding tissue object in image $IM_B$ was over-segmented in a different way in objects B1, B2, and B3. The forward and backward mapping implemented by the cross-linking, allows identifying this and the features of the so linked objects can be considered together when computing the transformation $T_{cl}$ for the given cross-link. Because the $T_{cl}$ computations are restricted to objects in the respective cross-link, these computations can be said to be computations "at object level". Cross-linking allows reducing the risk of feature starvation. That is, because of the cross-linking, more objects can be grouped together which increases the pool of features available for computing the locally adapted transformations. The computations are hence more robust and possibly more accurate Optionally, there is a step S275 which constitutes a refinement operation in case the segmentation returns relatively large tissue objects or in case the cross-linking yields cross-links made up from too many objects. In either of these cases, the object is subdivided into sub-objects $R_A$ as illustrated in FIG. 5. In the example shown, object o is a single region, and the sub-objects is this case are sub-regions of said single region. For each of these local sub-objects $R_A$, a sub-subset of features that belong only to the sub-object at hand is collected from the subset of features previously computed for object o. FIG. 5 is an illustration of the refinement operation of step S275 for relatively large objects (defined by using a suitable diameter threshold) with successive locally refined transformations, down to sub-object level. The hatched square $R_A$ in image $IM_A$ (left hand side of FIG. 5) is a local sub-object at tissue object o. The refinement is implementable by definition of a suitable grid (shown in dashed lines) that defines local sub-objects for tissue object o in image $IM_A$. The hatched square $R_B$ in image $IM_B$ (right hand side of FIG. 5) shows the local sub-object $R_A$ after warping from image $IM_A$ to image $IM_B$ using the estimated local transformation for object o at object level. The dashed lines in image $IM_B$ show the warped regular grid using the previously estimated transformation at object level. For local matching (that is, for constructing at sub-object level, a sub-locally adapted transformation $t_i$ for respective sets of sub-objects), the features observed in image $IM_A$ for sub-object $R_A$ are matched against the features observed in image $IM_B$ in the object obtained after warping, of the respective sub-object, with the previously estimated transformation for the current object o at object level. As mentioned, in the example of FIG. 5, object o is formed from a single region (shown as bounded by the curved line). Similar considerations apply if the object is a set of disconnected sub-regions where the refinement corresponds to breaking up said set into sub-subsets and to then define the refinement transformations $t_i$ as transformations between subsets of objects. In summary, we distinguish herein at least two (in one embodiment three) levels: The initial global transformation T, the one or more locally adapted object transformations $T_{cl}$ for objects in cross-link (object level), and, optionally, on the third level, the local refinements defined sub-local transformations $t_i$ for the sub-objects (sub-object level). Of course, the above can be extended to any number of levels n>3 with sub- . . . -sub-refinements if necessary.

At step S280 the combiner operates to combine the global transformation with the one or more local transformations obtained at object level and/or even sub-object level. The combined local and/or sub-local transformations result in a combined registration transformation which better takes into consideration local particulars. In some embodiments, a B-spline approach is used but other splining methods (e.g. thin-plate, etc) to combine the local transformations into a unitary function description are also envisaged.

Referring back to the B-spline embodiment, a b-spline transformation affords a compact definition of the new transformation by means of a regular grid of so-called knot positions in image IMA and, in addition, a local displacement vector of each knot location that defines the displacement of the knots when warped to image IMB. From this compact definition, the transformation at locations in between the knots is obtained using b-spline interpolation. More particularly, to some or all grid points in the regular grid, one initially assigns the displacement as inherited from the initial global transformation. Next, a check is run for all grid points if a local transformation has been computed within a neighborhood for the respective grid point at object level or even a sub-local transformation at sub-object level. If yes, for those grid points, instead of using the initial global transformation, the most local transformation, $T_{cl}$ or $t_i$ is used. As will be understood then, on some occasions, the initial global transformation may be retained at some grid points where no local transformation has been computed but may be replaced accordingly by $T_{cl}$ or $t_i$ at other grid points. In Applicant's tests a regular grid of knots with spacing of 16 pixels in both x and y direction at magnification 0.3× was used but this is exemplary only and other spacings and/or magnifications are also envisaged herein.

As will be recalled, for step S215, an option was described above where objects that are deemed too small are to be removed from consideration. In respect of embodiments where this option is used, it is then proposed herein, in one embodiment, that these objects will still be registered in the final transformation $T^{NEW}$ by means of the initial global transformation. In other words, these objects are then also to inherit a certain displacements as defined by the initial global transformation.

A person skilled in the art will realize that the division of object o into sub-objects may be done using partially overlapping sub-objects. Optionally, sub-objects of varying size may be used or sub-objects with varying number of elements may be used. For instance, features of a sub-object i in image $IM_A$ can be matched against a somewhat smaller object defined around the corresponding center location in image $IM_B$. If a reliable sub-local transformation $t_i$ is obtained (that is, one that achieves a preset amount of correspondence), this sub-local transformation is then accepted. If no reliable local transformation can be obtained, one or more attempts can be made using an object defined around the corresponding center location in image $IM_B$ of increasing size.

As before at step 270, the sub-local transformations are computed based on the sub-subset of features of the respective sub-objects. The sub-local transformations at sub-object level defined in the refinement operation S275 can then be combined at step S280 with the transformation obtained at the higher levels, that is, with those obtained at step S250 and step S270. It is of note, that the computations of the locally adapted or sub-locally adapted transformations are based on the same resolutions level as that used for computing the initial global transformation. In other words, there is no up- or down-sampling involved in these combinations as the image objects, or sub-objects are represented at the same image resolution level.

At step S290, the so combined transformation is then output. The newly computed transformation can then be applied to one of the objects in one of the input images to effect registration from the object in one of images (eg. $IM_A$ or $IM_B$) with objects in the other image ($IM_B$, $IM_A$). In one embodiment, an algorithmic description (eg, the b-spline formulation) of the combined registration transformation is stored at step S295 in a suitable memory. In this embodiment there is no requirement to store the actual registered/warped image. It is only the description of the transformation that is stored. This saves memory space and allows at a later stage to effect or re-effect the registration.

Optionally, there is a step S255, which invokes a down- or up-sampling if global registration at step S250 fails (at a given magnification, 0.3× for instance). The images are down-scaled by a certain factor (for instance by factor 2) and registration is then re-attempted at this lower level of magnification as a backup. Should registration still fail, an up-scaling may be used instead or one may take recourse to manual registration as a catch-all fall back.

In one embodiment, the result of step S250 (that is, the initial global transformation) is output, as this can already be used as an intermediate registration result. The user can start with this intermediate registration result, and will be provided with a more accurate registration result once the computational part of remaining steps S260-S280 will be completed. The updates can also be provided in steps, when processing tissue object after tissue object, etc. In this manner, a progressive update of the registration results can be provided. For instance, the updated registration result can be displayed at step S297, starting from registration results as per the initial transformation, and the subsequent intermediate registration results are then displayed in sequence in displaying step S297 until the final output, that is, the combined transformation is displayed. In other words, over the course of time, the registration is gradually refined and each time progress is made (eg, a cross-link has been processed) the refinement is used to update the currently shown registration result. Alternatively, registration results delivered by the respective locally adapted transformations can already be displayed in isolation, for the respective objects only. The displaying of intermediate results allows the user to check the quality of the registration results and abort the computations if necessary. Also, it allows the user to begin with, e.g., simultaneous navigation sooner.

As observed earlier, the proposed method involves estimation of transformation from features, in particular feature correspondences are established. In one embodiment, the feature correspondences obtained in step S240 are re-used in steps S250 and/or S270. Alternatively, knowledge about the global orientation difference between images A and B is used to speed-up the process of establishing the feature correspondences by orientation binning. Instead of looking for correspondences between features based on their descriptor only, the features are initially divided in groups based on their orientation feature. Next, feature correspondences are obtained between groups with similar orientation, taking the global orientation difference into account.

If, for some reason, it is not possible to obtain a transformation $T_o$ at object level for a given crosslink, for instance, (because the desired level of correspondence cannot be achieved for instance), the initial transformation T is used as backup. The same holds true in case of further refinement into sub-objects, eg sub-objects. That is, in case of failure to obtain sub-local transformations for sub-objects, the transformation at object level $T_o$ is used as backup.

Those skilled in the art will appreciate that the above system and method can also be applied for image registration of two or more tissue slices from the same tissue block, the two images IMA,IMB being sub-images of a single image.

Although application in digital pathology is the main application envisaged herein other applications are not excluded and in particular envisaged herein.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, in particular a non-transitory store medium, such as a CD-ROM, is presented wherein the computer readable medium has a computer program element stored on it which computer program element is described by the preceding section.

A computer program may be stored and/or distributed on a suitable medium (in particular bot necessarily a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An imaging processing component of an image processing system, the imaging processing component comprising:
   an input interface to receive at least two sets of image objects, wherein at least one set includes a single image object or a plurality of image objects, said at least two sets of image objects derived from imagery of biological material;
   an image feature deriver configured to derive image features of or in relation to the at least two sets of image objects;
   a global transformation builder configured to compute, based on said image features, an initial global registration transformation for the at least two sets of image objects;
   a cross-linker configured to establish, based on said initial global registration transformation and its inverse, at least one cross-link between image objects from the at least two sets of image objects, wherein the at least one cross-link is based on mapping action points in one of the at least two sets of image objects onto another of the at least two sets of image objects using the initial global registration transformation and then mapping action points in the another of the at least two sets of image objects onto the one of the at least two sets of image objects using the inverse of the initial global registration transformation;
   wherein each of the image objects is a region or set of image points of an image, and
   wherein a cross-link lumps together all those image objects across the at least two sets of image objects that can be reached by a mapping action of the initial global registration transformation or its inverse.

2. The image processing component of claim 1, further comprising:
   a local transformation builder, configured to compute for said cross-link, at least one locally adapted transformation that is restricted to those image objects that are cross-linked in said cross-link;
   a combiner configured to perform a combination operation to combine i) at least said locally adapted transformation and at least a part of said initial global registration transformation or ii) a plurality of locally adapted transformations into a combined registration transformation for the at least two sets of image objects; and
   an output interface to output said new global transformation.

3. The image processing component of claim 2, wherein operation of the local transformation builder for computing the at least one locally adapted transformation is based on one or more of the features previously derived by the image feature deriver.

4. The image processing component of claim 1, comprising a refiner configured to:
   sub-divide respective image objects from said at least two sets of image objects, into sub-objects to obtain sets of sub-objects;
   compute, for said sub-objects at least one sub-locally adapted transformation; wherein the combiner is operative to include into said combination operation, said at least one sub-locally adapted transformation.

5. The image processing component of claim 1, comprising a graphics display generator operative to one or a combination of effect displaying a registration result as per said initial global transformation or to update the displaying for a new registration result as per an intermediate registration or as per the combined registration transformation.

6. The image processing component of claim 5, further including a sampler configured to up- or down-sample at least one of the at least two sets of image objects in case no initial global transformation can be computed by the global transformation builder.

7. The image processing component of claim 2, wherein operation of the combiner is based on B-splining.

8. The image processing component of claim 1, wherein at least one of said at least two sets of image objects has been derived by an image segmentation operation applied to said imagery.

9. An image processing system comprising:
   an image processing component, comprising:
      an input interface to receive at least two sets of image objects, wherein at least one set includes a single image object or a plurality of image objects, said at least two sets of image objects derived from imagery of biological material;
      an image feature deriver configured to derive image features of or in relation to the at least two sets of image objects;
      a global transformation builder configured to compute, based on said image features, an initial global registration transformation for the at least two sets of image objects;
      a cross-linker configured to establish, based on said initial global registration transformation and its inverse, at least one cross-link between image objects from the at least two sets of image objects, wherein the at least one cross-link is based on mapping action points in one of the at least two sets of image objects onto another of the at least two sets of image objects using the initial global registration transformation and then mapping action points in the another of the at least two sets of image objects onto the one of the at least two sets of image objects using the inverse of the initial global registration transformation;
      wherein each of the image objects is a region or set of image points of an image, and
      wherein a cross-link lumps together all those image objects across the at least two sets of image objects that can be reached by a mapping action of the initial global registration transformation or its inverse; and
   an image capturing device supplying the imagery from which the at least two sets of image objects have been derived.

10. An image processing method, comprising:
   receiving at least two sets of image objects, wherein at least one set includes a single image object or a plurality of image objects, said at least two sets of image objects derived from imagery of biological material;
   deriving image features of or in relation to the image object in the at least two sets of image objects;
   based on said image features, computing an initial global registration transformation for the at least two sets of image objects;

establishing, based on said initial global registration transformation and its inverse, at least one cross-link between image objects from the at least two sets of image objects, wherein the at least one cross-link is based on mapping action points in one of the at least two sets of image objects onto another of the at least two sets of image objects using the initial global registration transformation and then mapping action points in the another of the at least two sets of image objects onto the one of the at least two sets of image objects using the inverse of the initial global registration transformation.

11. The image processing method of claim 10, comprising:
for said at least one cross-link, computing at least one locally adapted transformation that is restricted to those image objects that are cross-linked in said cross-link;
combining i) at least said locally adapted transformation and at least a part of said initial global registration transformation or ii) a plurality of locally adapted transformations into a combined registration transformation for the at least two sets of image objects; and
outputting said combined transformation.

12. The image processing method of claim 11, wherein the step of computing the at least one locally adapted transformation is based on one or more of the features previously derived at the deriving step.

13. The image processing method of claim 10, wherein said imagery of biological material includes at least one digital pathology image.

14. The image processing method of claim 10, wherein the computing of the at least one locally adapted function is performed at a same resolution level than the computing of the initial global registration transformation.

15. A computer program element for controlling a component, which, when being executed by a processing unit is adapted to perform the method steps of claim 10.

16. A non-transitory computer readable medium having stored thereon the computer program element of claim 15.

* * * * *